United States Patent Office 2,808,369
Patented Oct. 1, 1957

2,808,369
COAL PURIFICATION

John H. Hickey, Pittsburgh, Pa., assignor to Great Lakes Carbon Corporation, New York, N. Y., a corporation of Delaware No Drawing. Application November 6, 1952, Serial No. 319,179

8 Claims. (Cl. 202—25)

This invention relates to a method for preparing coal for use in the manufacture of electrodes and the like. More particularly it relates to a method for removing certain undesirable constituents that appear in minute amounts in coal even after the coal has been subjected to the most efficient beneficiation by mechanical methods and at the same time putting it in condition for coking under controlled conditions to produce refractory carbon.

Coal as it occurs contains more or less of mineral inorganic constituents of various kinds. Some of these appear as inclusions of sufficient size that they can be sorted out by hand or by water washing, or by gravity or froth flotation. The various coals thus treated vary in ultimate ash content over a comparatively wide range. If coal is ground to a fine mesh size and subjected to gravity or froth flotation, it is possible to remove the larger portion of these ash constituents but it is impossible to remove them all. Coke having a high ash content has limited utility as a constituent of carbon electrodes, metallurgical coke, graphite, etc. This appears to bear no particular relationship to the ash content as such, except where some one ash constituent is of itself objectionable, but the actual properties of the finished product are sometimes good and sometimes not.

I have developed a process for the substantially complete removal of certain objectionable constituents from high volatile bituminous coal and similar organic substances and at the same time have improved the properties of the coke obtainable from the treated coal. Among the materials which may be removed substantially completely is silica although other objectionable constituents may also be removed in greater or lesser amount according to this invention. It has been found that the benefit derived by the coal for certain uses such as in the manufacture of carbon electrodes and metallurgical coke is improved over and above what would be expected merely from the removal of the silica. For many purposes the minor amounts of silica remaining after mechanical beneficiation is not objectionable but in the production of carbon electrodes, metallurgical coke, and the like, it has been found that products containing even a few tenths of a percent of silica are objectionable and often cannot be used. It is an object therefore of this invention to make available carbonaceous materials for the manufacture of carbon electrodes such as those used in the manufacture of aluminum and magnesium wherein the presence of silica and certain other impurities is detrimental.

The reagents which I use in this process are termed "volatilizable fluorides." The term "volatilizable fluoride" as used herein includes those fluorides which are volatile below about 400° C. exclusive of the fluorides of silicon and hydrogen.

The volatile fluorine compounds which may be used in the present invention comprise ammonium bifluoride, ammonium fluoride, and mixtures of hydrogen fluoride with ammonia. Other volatile fluorine compounds capable of decomposing at the temperature at which the heating occurs may be employed. These include certain organic fluorine compounds and the hydrogen fluoride salts of certain compounds particularly organic bases such as the nitrogen bases, including pyridines, methyl amine, and the like.

The process has a number of advantages. Aqueous solutions of corrosive fluorides are not used, thus eliminating many of the problems of contacting, separating, washing and drying large quantities of material which such processes require. The coal has superior carbonizing properties after my treatment over processes using aqueous solutions or nonvolatile treating agents. The unconsumed treating agent of this invention is readily recovered and recycled. Also the products such as fluorides of silicon can be reconverted into active treating agent by known methods. In addition, removal of impurities such as silica is substantially complete with this process.

My co-pending patent application, S. N. 772,882, filed September 8, 1947, now Patent No. 2,624,698, of which the present application is continuation-in-part, relates to a process for treating coal for producing useful carbonaceous products therefrom such as the production of carbon electrodes, which comprises crushing the coal to a mesh size of approximately 10 mesh or smaller, reducing the inorganic mineral content of said coal by means of mechanical methods, subjecting the partially purified coal to the action of a volatile compound of fluorine at a temperature below that at which the coal becomes plastic but at a temperature at which the volatile silicon compounds formed will be driven off, for substantially complete removal of the silicon present.

I have also found that if the coal is given a particular heat treatment prior to treatment with a volatilizable fluorine compound, the silicon content may be reduced even further. This is particularly true in the case of high volatile bituminous coals. Furthermore, I have found that if this coal, preheated or otherwise, is briquetted following admixture with ammonium fluoride or bifluoride, the subsequent reaction between the silicon impurities and the fluorine compound on heating, is highly effective.

I have found that at atmospheric pressure high volatile coals are less completely freed from silicon than are low volatile coals, this being illustrated in Table I.

TABLE I

Effect of volatile content on removal of silicon

| Coal | Type | Percent Silicon (Volatile Matter free Basis) | |
|---|---|---|---|
| | | Before Treatment [1] | After Treatment [1] |
| Elma, No. 1 mine, Pa. | Low vol. bituminous. | 0.82 | 0.01 |
| Peerless mine, W. Va. | ____do____ | 0.23 | 0.01 |
| Empire mine, Ala. | High vol. bituminous. | 0.26 | 0.07 |

[1] All treatments were carried out at atmospheric pressure using 12 lb. ammonium bifluoride per lb. silicon in the coal.

Samples of various high volatile bituminous coals were crushed to pass a 60 Tyler mesh screen. Some of these samples were given heat treatments at 250° C. to about 400° C. to remove varying amounts of volatile matter. All of the samples, whether or not heat treated, were then treated with a volatilizable fluoride. In every case, removal of volatile matter prior to treatment with a volatilizable fluoride. In every case, removal of volatile matter prior to treatment with a volatilizable fluoride resulted in removal of silicon impurities to a degree more than that which would normally be expected.

The devolatilization treatment must be accomplished without changing the physical structure of the coal. Since structural changes occur in coal when it is coked, the temperature of preliminary devolatilization must be kept below the coking temperature.

The charging stock which may be used includes high volatile bituminous coals of a coking and non-coking nature.

The exact procedural steps employed will depend to a large extent upon the character of the fluorine compound used. For example, when treating high volatile bituminous coal with a volatilizable fluoride other than silicon fluoride and hydrogen fluoride it has been my custom to preheat the coal to the reaction temperature in the range of about 250–400° C. and then add the volatilizable fluoride over a period of time in such a manner that it comes thoroughly into contact with the heated coal. Care must be taken that the coal is not allowed to reach a temperature in excess of about 400–500° C., otherwise carbonization begins to occur. The coking coals begin to swell and coalesce before they have received sufficient treatment to reduce the ash content and particularly the silica content below the desired amount. If the temperature reaches the point at which the coal begins to become plastic before the treatment is complete, the resultant product cannot be adequately treated to obtain the desired result even by long and extended treatment.

It is advantageous to hinder escape of the volatile ammonium bifluoride until such time as reaction between the silicon and reagent shall have reached completion. This can be accomplished by operating in a closed system.

In a specific embodiment of my invention a substantially closed system is obtained by briquetting the mixture of comminuted coal, ammonium bifluoride or ammonium fluoride, and if desirable, a carbonaceous binder. A number of suitable binders are known to the art such as pitches derived from coal tar and heavy petroleum stocks and from distillation of pine stumps and other cellulosic residues. Also, it may be preferable to use a binder which is composed, all or in part, of a suitable portion of the distillate obtained in this process from the carbonization of the briquettes. These briquettes are then heated at a suitable rate to 175° C. to about 400° C. but in any event to a temperature less than the plastic temperature of the coal. In each briquette the volatilizable ammonium fluoride compound will be closely confined with the coal particles and substantially complete utilization of reagent may be accomplished and silicon subsequently volatilized. The briquettes may then be coked by a suitable process, for example, that described in U. S. Patent 2,131,702. Most, if not all, of the fluoride used will be volatilized, in one form or another, below 400° C., and can be recovered, reconverted to ammonium bifluoride, and reused in the process.

It is important to keep in mind that if the coal to be purified is preheated, it must be cooled to a temperature less than the vaporizing temperature of the reagent prior to mixing the coal and reagent. Otherwise, the reagent will be largely lost to the atmosphere before it can be confined by the subsequent briquetting process.

Some bituminous coals have a tendency to coke and swell badly during carbonization. It is well known to the art that this difficulty may be overcome by a pre-oxidizing treatment, which when applied to my process would precede the mixing of the coal with ammonium bifluoride and binder.

When treating coking coals having a relatively high volatile content without a briquetting step, improved results are obtained if the heating is carried out under superimposed pressure or under the vapor pressure of the treating agent at the operating conditions. With this type of coal and when using a pressurized system, temperatures may be used in the range of about 100° C. to 400° C., the upper limit depending on the plasticizing temperature. Preferably the temperature is kept at a minimum in order to obtain the results desired.

The treatment with fluorine compounds mentioned herein is in effect a two stage operation in which the coal and fluorine compound is heated in a primary stage at a relatively low temperature of about 150° C. to 250° C. and is then subjected to a high temperature treatment at about 350° C. to 400° C. to volatilize fluorides of silicon, the remaining unchanged reagent and any ammonium salts which may have been formed during the course of the treatment. The volatilization step should also be carried out below the temperature at which the coal becomes plastic, since this appears to be a critical condition to the most successful treatment of the coal.

The non-coking coals generally do not coalesce to any substantial extent without being heated to a temperature high enough to carbonize them. The non-coking coals may be ground to a fine state of subdivision, treated mechanically to remove most of the ash, preheated, and then treated at the lower temperatures described with one of the volatile fluorine compounds disclosed herein, under the described conditions, and finally heated to a temperature sufficiently high to drive off any volatile fluorides formed without special regard as to whether the coal is destructively distilled or not.

The non-coking coals can be treated, as described above, below the temperature of destructive distillation, and then mixed with a binder, either hot or cold, and carbonized to put it in proper form for subsequent use.

On the other hand ground coking coal when treated below the point at which the mass becomes plastic can be purified and then upon heating to a temperature above that at which it cokes, may be made to coalesce forming particles of the size most desirable in electrode manufacture.

Coking and non-coking coals are not exactly equivalent in this process. Due to the tendency of the former to fuse together at higher temperatures, larger particles are formed during coking which is desirable when the coke is to be used in electrode manufacture. It is an advantage to be able to grind the coal to pass for example a 60 mesh screen or finer in view of the fact that the purification such as silica removal is substantially improved by this procedure. With coking coals, the subsequent coking steps causes the particles to coalesce, and they are readily coked under conditions to produce coke of the most desirable physical properties.

The apparatus may comprise various types of kilns known to the industry; they include the so-called fluidized flow of solids, and other suitable methods. The unreacted reagent may be recovered substantially completely. One method of accomplishing this is to pass the coal in the form of fine particles through a treating zone. The moving coal which may be "fluidized" by passing countercurrently thereto the vapors of the volatile fluoride together with an inert gas sufficient to induce fluidizing of the particles. In a moving bed operation coal granules may be continuously fed downwardly through a heated zone. Ammonium fluoride or ammonium bifluoride vapors may be introduced into the moving bed.

The proportion of the volatile fluoride to the raw coal depends to a large extent upon the impurities present which may be removed as volatile compounds. When removing silica only, the proportion of volatile fluoride is in excess of the amount required stoichiometrically to react with the silica present. In general, at least two times the stoichiometric amount of fluorine is used and it is preferably in the range of about 2 to 5 times that required to react with all of the silica. This proportion will depend to some extent upon the mode of operation. For example, when using a batch operation, a larger quantity of active fluorine is required than when using a continuous countercurrent method. In the countercurrent method the amount of volatile fluoride required may be as low as about 1.5 times the equivalent of the impurities with which the fluorine reacts.

In general the pressure applied to the system during the soaking period is slightly above atmospheric and this may be obtained by allowing the system to reach the pressure attainable due to the vapor pressure of the volatile reagent or may be obtained by superimposing pressure of an inert gas.

In general when employing pressure, the time factor may range from the period of time that is required to heat the mixture up to the point at which the maximum vapor pressure effect of the reagent is observed, to a period of about 1 to 2 hours depending upon the temperature and how much volatile matter is present in the coal. For practical purposes the temperature and time at as low a value as possible to obtain the results will be used.

In the step during which the volatile treating agent and the volatile reaction constituents are removed by distillation, the pressure may be atmospheric but is preferably subatmospheric in order to be sure that substantially all of the volatile compounds are removed. Instead of a vacuum and in certain cases supplementing it, an inert sweep gas may be passed through the treated coal to assist in the removal of the last traces of fluorine.

If an extraneous gas is employed, it should preferably be one which is unreactive with any or all of the constituents at operating conditions, and it should be a non-oxidizing gas. Nitrogen, carbon dioxide, and flue gas substantially free of oxygen are examples of this. Carbon monoxide, water gas or natural gas may also be used. Oxygen is generally objectionable in that it tends to impair the coking properties of the coal and it has been found advantageous to maintain a reducing atmosphere around the coal during treatment except that in some instances a limited and carefully controlled extent of oxidation may be beneficial.

The particle size of the coal may range from approximately 0.25 inch to finely divided particles passing a 300 mesh sieve. The smaller sizes favor more ready removal of impurities and the end result is one of greater removal of silica and in general, less consumption of time. When employing coking coals which will coalesce during the coking step, the fine particle sizes are preferred. For reasons of economy, coal passing a 10 to 100 mesh is effective although for my purpose it may be crushed to pass for example a 60 mesh screen. Conditions of treatment should be such as to permit the volatile fluoride to penetrate the particles and permeate them to assure the maximum beneficial effect.

The rate of temperature rise following the treatment with fluoride may be varied over a wide range but a rate of about 60° C. to 80° C. per hour has been found to be satisfactory when using conventional coke oven apparatus. The temperature should be held below the decomposition temperature of the coal throughout the volatilization step. It may then be increased to coke the coal, particularly when the treatment and coking are carried out in the same apparatus.

Either ammonium bifluoride or ammonium fluoride is suitable but the bifluoride is preferred. Under the condition of treatment, an ammonio-silico fluoride is formed in the first step and volatilized in the second step. This may be decomposed to liberate hydrogen fluoride which is used again in the preparation of ammonium bifluoride.

A gaseous mixture containing approximately 2 moles of hydrogen fluoride and 0–1 mole of ammonia which are mixed and passed into contact with the heated coal may be used. The presence of some $NH_3$ is beneficial in that more or less of the iron present in the coal is rendered water soluble and can be subsequently leached out by water or dilute acids.

EXAMPLE I

A portion of gravity floated, Bell Coal Company, high volatile bituminous coal was dry crushed to pass a 60 Tyler mesh sieve and then heated at about 350° C. (coking would occur at about 380° C.) to a weight loss of 7%. It was then mixed with twice theoretical ammonium bifluoride. The mixture was heated during one hour to 255° C. in a closed stainless steel reactor and held at this temperature for one hour more, after which the volatile products were distilled out under a slight vacuum while the temperature was raised to 390° C. during 3.5 hours. The product contained 0.03% silicon, volatile matter free basis, and retained only 0.2% fluorine.

EXAMPLE II

A portion of high volatile Sweetwater, Wyoming, float coal was dry crushed to pass a 60 Tyler mesh sieve and then partially devolatilized to 32% volatile matter. It was then treated with twice theoretical ammonium bifluoride as in Example I. Silicon content was reduced only to 0.07%.

EXAMPLE III

A portion of the same coal as was used in Example II was partly devolatilized to 22% volatile matter. On treatment with ammonium monofluoride as in Example I, the silicon content was reduced to 0.03%.

EXAMPLE IV

A portion of Utah float coal (Sunnyside mine) was dry crushed to pass a 60 Tyler mesh sieve and then treated in an atmospheric pressure batch process with twice theoretical (69 lb./net ton float coal) ammonium bifluoride. The product contained 0.05% silicon.

EXAMPLE V

A portion of the same Utah float, dry crushed coal as was used in Example IV was devolatilized to 31% volatile matter. After treatment with ammonium monofluoride as in Example 1, the product contained 0.02% silicon.

I claim:

1. A process for purifying high volatile bituminous coal containing silicon impurities which comprises preheating a comminuted coal to a temperature of at least about 250° C. but in any event less than the coking temperature to effect a partial devolatilization, contacting the preheated coal with a substance selected from the group consisting of volatilizable fluorides other than silicon fluoride and hydrogen fluoride, at a temperature above 100° C. and in any event above the vaporization point of said fluoride but below the temperature at which the preheated coal becomes plastic, thereby reacting the fluoride with the silicon impurities, and finally removing the resulting silicon fluorides and unreacted fluorides by volatilization at a temperature below that at which the preheated coal becomes plastic.

2. The process of claim 1, wherein the substance selected is ammonium monofluoride.

3. The process of claim 1, wherein the substance selected is ammonium bifluoride.

4. A process for purifying high volatile bituminous coal containing silicon impurities which comprises preheating a comminuted coal to a temperature of at least about 250° C. but in any event below the coking temperature to effect a partial devolatilization and then moving the preheated coal in a continuous stream countercurrent to a continuous stream of gaseous ammonium bifluoride to effect reaction of the fluoride with the silicon impurities and thereby removing the latter from the preheated coal.

5. A process of manufacturing a purified coke from high volatile bituminous coal containing silicon impurities which comprises heating a comminuted coal to a temperature of at least about 250° C. but in any event less than the coking temperature to effect a partial devolatilization, allowing the coal to cool to a temperature below the vaporization point of ammonium monofluoride, admixing the partially devolatilized coal with ammonium monofluoride and a carbonaceous binder, pressing the resulting mixture into briquettes, heating the briquettes at a temperature above about 175° C. but in any event less than the plastic temperature of the treated coal to react the fluoride with the silicon impurities, and finally heating the briquettes above their plastic temperature to volatilize silicon fluorides and unreacted fluorides to produce a purified coke.

6. A process for manufacturing a purified coke from comminuted high volatile bituminous coal containing silicon impurities which comprises heating the comminuted coal to a temperature of at least about 250° C. but in any event less than the coking temperature to effect a partial devolatilization, allowing the coal to cool to a temperature below the vaporization point of ammonium bifluoride, admixing the partially devolatilized coal with ammonium bifluoride and a carbonaceous binder, pressing the resulting mixture into briquettes, heating the briquettes at a temperature above about 175° C. but in any event less than the plastic temperature of the treated coal to react the fluoride with the silicon impurities, and finally heating the briquettes above their plastic temperature to volatilize silicon fluoride and unreacted fluorides to produce a purified coke.

7. A process for manufacturing a purified coke from high volatile bituminous coal containing silicon impurities which comprises admixing a comminuted coal with ammonium monofluoride and a carbonaceous binder, pressing the resulting mixture into briquettes, heating the briquettes at a temperature above about 175° C. but in any event less than the plastic temperature of the treated coal to react the fluoride with the silicon impurities, and finally heating the briquettes above their plastic temperature to volatilize silicon fluorides and unreacted fluorides to produce a purified coke.

8. A process for manufacturing a purified coke from high volatile bituminous coal containing silicon impurities which comprises admixing a comminuted coal with ammonium bifluoride and a carbonaceous binder, pressing the resulting mixture into briquettes, heating the briquettes at a temperature above about 175° C. but in any event less than the plastic temperature of the treated coal to react the fluoride with the silicon impurities, and finally heating the briquettes above their plastic temperature to volatilize silicon fluorides and unreacted fluorides to produce a purified coke.

References Cited in the file of this patent

UNITED STATES PATENTS

| Number | Name | Date |
|---|---|---|
| 733,389 | Hall | July 14, 1903 |
| 1,303,362 | Matt | May 13, 1919 |
| 1,380,458 | Woodruff et al. | June 7, 1921 |
| 1,481,627 | Smith | Jan. 22, 1924 |
| 1,517,819 | Bur | Dec. 2, 1924 |
| 1,911,004 | Svendsen | May 23, 1933 |
| 2,167,100 | Benezech | July 25, 1939 |
| 2,315,346 | Mitchell | Mar. 30, 1943 |
| 2,609,331 | Chevey | Sept. 2, 1952 |
| 2,624,698 | Hickey | Jan. 6, 1953 |
| 2,661,326 | Stillman | Dec. 1, 1953 |

FOREIGN PATENTS

| Number | Country | Date |
|---|---|---|
| 412,209 | Great Britain | June 18, 1934 |

OTHER REFERENCES

Mantell: "Industrial Carbon," 2nd ed., 1946, pages 217–218.